United States Patent
Bi et al.

(10) Patent No.: US 11,785,124 B2
(45) Date of Patent: Oct. 10, 2023

(54) HOUSING ASSEMBLY, METHOD FOR MANUFACTURING HOUSING ASSEMBLY, AND ELECTRONIC DEVICE

(71) Applicant: GUANGDONG OPPO MOBILE TELECOMMUNICATIONS CORP., LTD., Guangdong (CN)

(72) Inventors: Sipeng Bi, Guangdong (CN); Guangming Yang, Guangdong (CN); Tibo Hou, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 504 days.

(21) Appl. No.: 16/899,018

(22) Filed: Jun. 11, 2020

(65) Prior Publication Data
US 2020/0412855 A1   Dec. 31, 2020

(30) Foreign Application Priority Data

Jun. 27, 2019  (CN) .......................... 201910568846.8
Jun. 27, 2019  (CN) .......................... 201920991825.2

(51) Int. Cl.
*H04M 1/02*   (2006.01)
*B29C 65/48*  (2006.01)
(Continued)

(52) U.S. Cl.
CPC ........... *H04M 1/0266* (2013.01); *B29C 65/48* (2013.01); *B29C 66/00145* (2013.01); *B29C 66/7465* (2013.01); *C03B 23/023* (2013.01)

(58) Field of Classification Search
CPC ... H04M 1/0266; H04M 1/0202; B29C 65/48; B29C 66/00145; B29C 66/7465;
(Continued)

(56) References Cited

U.S. PATENT DOCUMENTS

2009/0186168 A1*  7/2009  Nitta ..................... B29C 48/914
                                                    428/156
2018/0184529 A1*  6/2018  Kim .......................... B32B 7/06

FOREIGN PATENT DOCUMENTS

CN    107347103 A  * 11/2017
CN    107465773 A  * 12/2017
(Continued)

OTHER PUBLICATIONS

TWM551564U Machine Translation of Description and Claims (Google) (Year: 2022).*
(Continued)

*Primary Examiner* — Cynthia L Schaller
(74) *Attorney, Agent, or Firm* — Young Basile Hanlon & MacFarlane, P.C.

(57) ABSTRACT

A housing assembly, a method for manufacturing the housing assembly, and an electronic device are provided according to the present disclosure. The housing assembly includes a housing body and a flexible film layer. The housing body has a bottom portion and at least one side wall connected with an outer edge of the bottom portion, and each of the at least one side wall and the bottom portion cooperatively define a bending angle larger than 70 degrees. The flexible film layer is disposed on a first surface of the housing body, and the flexible film layer has an elongation at break higher than or equal to 150%.

18 Claims, 6 Drawing Sheets

(51) Int. Cl.
B29C 65/00 (2006.01)
C03B 23/023 (2006.01)

(58) Field of Classification Search
CPC . C03B 23/023; B32B 37/0015; B32B 37/003; B32B 2255/10; B32B 2307/402; B32B 2307/50; B32B 7/022; B32B 27/08; B32B 27/304; B32B 27/32; B32B 27/36; B32B 27/40; B32B 37/0007; B32B 37/1018; B32B 38/1866; B32B 1/00; B32B 2457/00; B44C 1/10
See application file for complete search history.

(56) References Cited

FOREIGN PATENT DOCUMENTS

| | | |
|---|---|---|
| CN | 207897243 U | 9/2018 |
| CN | 109591302 A | 4/2019 |
| CN | 109874253 A | 6/2019 |
| EP | 3481165 A1 | 5/2019 |
| TW | M551564 U * | 11/2017 |

OTHER PUBLICATIONS

CN107347103A Machine Translation of Description (EPO/Google) (Year: 2022).*
CN107465773A Machine Translation of Description (EPO/Google) (Year: 2022).*
ISR issued in corresponding international application No. PCT/CN2020/096613 dated Aug. 19, 2020.
EESR issued in corresponding European application No. 20181453.0 dated Sep. 29, 2020.
Indian First Examination Report for IN Application 202014026235 dated Mar. 28, 2023. (7 pages).

* cited by examiner

```
┌─────────────────────────────────────────────────┐
│ Provide a housing body, where the housing body has a │      100
│ bottom portion and at least one side wall connected │
│ with an outer edge of the bottom portion, and the side│
│ wall and the bottom portion cooperatively define a  │
│ bending angle larger than 70 degrees             │
└─────────────────────────────────────────────────┘
                        │
                        ▼
┌─────────────────────────────────────────────────┐
│ Provide a flexible film layer, where the flexible film│      200
│ layer has two surfaces opposite each other, and the │
│ flexible film layer has an elongation at break higher│
│ than or equal to 150%                           │
└─────────────────────────────────────────────────┘
                        │
                        ▼
┌─────────────────────────────────────────────────┐
│  Attach one of the two surfaces of the flexible film│      300
│ layer to a first surface of the housing body in a vacuum│
└─────────────────────────────────────────────────┘
```

```
┌─────────────────────────────────────────────┐
│ Align a first predetermined region of the   │
│ flexible film layer with a second           │  310
│ predetermined region of the first surface   │
│ and attach the first predetermined region   │
│ of the flexible film layer aligned with the │
│ second predetermined region with the        │
│ second predetermined region of the first    │
│ surface, so as to obtain a composite body   │
└─────────────────────────────────────────────┘
                      │
                      ▼
┌─────────────────────────────────────────────┐
│ Perform a vacuum attaching in a vacuum for  │  320
│ the composite body to obtain a housing      │
│ assembly                                    │
└─────────────────────────────────────────────┘
```

HOUSING ASSEMBLY, METHOD FOR MANUFACTURING HOUSING ASSEMBLY, AND ELECTRONIC DEVICE

CROSS-REFERENCE TO RELATED APPLICATION(S)

This application claims priority to Chinese Patent Application Serial No. 201910568846.8, filed on Jun. 27, 2019 and Chinese Patent Application Serial No. 201920991825.2, filed on Jun. 27, 2019, the entire disclosures of both of which are hereby incorporated by reference.

TECHNICAL FIELD

This disclosure relates to the technical field of housings, and in particular, to a housing assembly, a method for manufacturing the housing assembly, and an electronic device.

BACKGROUND

Currently, when manufacturing an integrated housing (for example, a housing curved at edges) of a mobile phone, a film is usually attached to a glass via vacuum bonding. However, because a conventional film is made from a polyethylene terephthalate (PET) film with poor tensile properties, the above method is only used for attaching the PET film to a glass curved at edges at a relatively small angle(s). For a glass curved at the edges at a relatively large angle, it is difficult to attach the PET film to the glass. In addition, four corners of the integrated housing are prone to air bubbles and wrinkles, which results in failure of attaching the PET film to the glass.

SUMMARY

The present disclosure aims to provide a housing assembly, a method for manufacturing the housing assembly, and an electronic device.

According to an aspect of the present disclosure, a housing assembly is provided. According to implementations of the present disclosure, the housing assembly includes a housing body and a flexible film layer. The housing body has a bottom portion and at least one side wall connected with an outer edge of the bottom portion, and each of the at least one side wall and the bottom portion cooperatively define a bending angle larger than 70 degrees. The flexible film layer is disposed on a first surface of the housing body, and the flexible film layer has an elongation at break higher than or equal to 150%. The first surface of the housing body includes a surface of the bottom portion close to the flexible film layer and a surface of the at least one side wall close to the flexible film layer.

According to another aspect of the present disclosure, a method for manufacturing a housing assembly is provided. According to the implementations of the present disclosure, the method includes the followings. A housing body is provided, the housing body has a bottom portion and at least one side wall connected with an outer edge of the bottom portion, and each of the at least one side wall and the bottom portion cooperatively define a bending angle larger than 70 degrees. A flexible film layer having two surfaces opposite each other is provided, and the flexible film layer has an elongation at break higher than or equal to 150%. One of the two surfaces of the flexible film layer is attached to a first surface of the housing body in a vacuum.

According to yet another aspect of the present disclosure, an electronic device is provided. The electronic device includes a housing assembly, a display screen assembly coupled with the housing assembly, and a motherboard. The housing assembly includes a housing body and a flexible film layer. The housing body has a bottom portion and at least one side wall connected with an outer edge of the bottom portion, and each of the at least one side wall and the bottom portion cooperatively define a bending angle larger than 70 degrees. The flexible film layer is disposed on a first surface of the housing body close to an inside of the electronic device, and the flexible film layer has an elongation at break higher than or equal to 150%. The first surface of the housing body includes a surface of the bottom portion close to the flexible film layer and a surface of the at least one side wall close to the flexible film layer. The display screen assembly and the housing assembly together define an accommodation space. The motherboard is disposed within the accommodation space and electrically coupled with the display screen assembly.

DETAILED DESCRIPTION

The implementations of the present disclosure are described in detail below. The implementations described below are examples and only used to explain the present disclosure, and should not be construed as limiting the present disclosure. The implementations without indicating specified technologies or conditions are carried out according to technologies or conditions described in the literature in the art or the product description.

Figure 1:
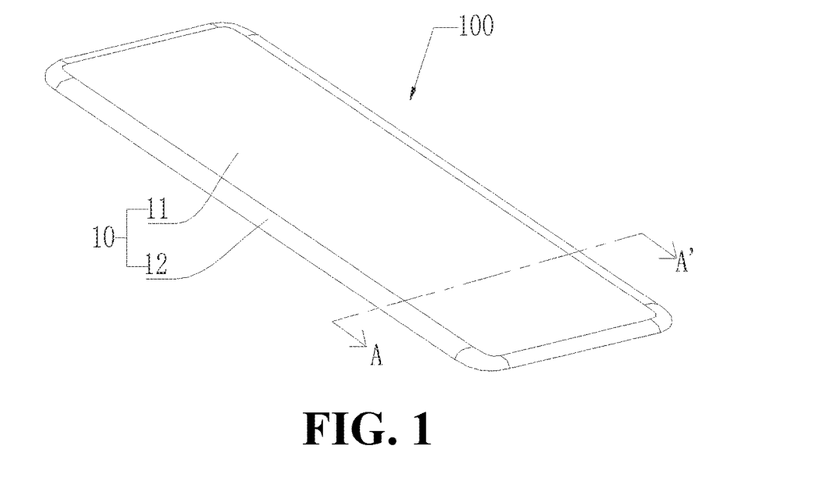
FIG. 1 is a schematic structural view of a housing assembly in an implementation of the present disclosure.
Figure 2:
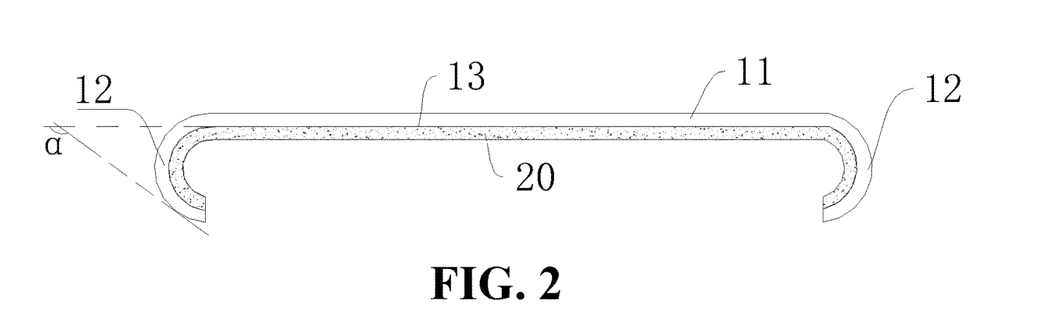
FIG. 2 is a cross-sectional view of the housing assembly illustrated in FIG. 1, taken along a line AA'.

According to an aspect of the present disclosure, a housing assembly 100 is provided. According to an implementation of the present disclosure, as illustrated in FIG. 1 and FIG. 2, the housing assembly 100 includes a housing body 10 and a flexible film layer 20. The housing body 10 has a bottom portion 11 and at least one side wall 12 connected with an outer edge of the bottom portion 11 (as illustrated in FIG. 1, an example that four side walls 12 are provided around the bottom portion 11 is taken for illustration), and the side wall 12 and the bottom portion 11 cooperatively define a bending angle α larger than 70 degrees. The flexible film layer 20 is disposed on a first surface 13 of the housing body 10, and the flexible film layer 20 has an elongation at break higher than or equal to 150%. The first surface of the housing body 10 includes a surface of the bottom portion 11 close to the flexible film layer 20 and a surface of the at least one side wall 12 close to the flexible film layer 20. Due to the relatively high elongation at break of the flexible film layer 20, the flexible film layer 20 has relatively good tensile properties. Therefore, the flexible film layer 20 can be perfectly attached to the housing body 10 curved at edges at a relatively large angle(s), without air bubbles or wrinkles, thereby effectively enhancing aesthetic appearance, appearance expressive ability, and a yield rate of the housing assembly 100 (the yield rate may be as high as 80% or more). When the elongation at break of the flexible film layer 20 is lower than 150%, the flexible film layer 20 has relatively poor tensile properties, and during attaching the flexible film layer 20 to the housing body 10, the flexible film layer 20 is not easily stretched, resulting in an imperfect attachment between the flexible film layer 20 and the housing body 10, and thus wrinkles or air bubbles are easily generated.

In an implementation, the flexible film layer 20 may be a no substrate film layer (i.e., a substrate-less film layer).

In another implementation, the flexible film layer 20 may be a flexible film layer disposed on a flexible substrate (not illustrated in the drawings) of the housing assembly 100.

It is noted that, in the implementations of the present disclosure, the housing body 10 may be made of glass.

At present, polyethylene terephthalates (PET) are usually used to form a substrate (hereinafter referred to as a PET substrate) that can be attached to the housing body 10. However, when the housing body 10 is curved at the edges at a relatively large angle, that is, the bending angle α defined between the side wall 12 and the bottom portion 11 is relatively large, since the PET substrate has poor tensile properties and is not easily bent, it is difficult to perfectly attach the PET substrate to the side wall 12, such that air bubbles are easily generated between the side wall 12 and the PET substrate. In an implementation, when the housing assembly 100 has four side walls, it is more difficult to perfectly attach the PET substrate to a junction between each two adjacent side walls (that is, each of corners of the housing assembly 100), such that not only bubbles but also wrinkles are easily generated. In the implementations of the present disclosure, the flexible film layer 20 is used as the substrate. Since the flexible film layer 20 has good tensile properties, the flexible film layer 20 can be stretched to a certain extent and attached to the side walls 12 and the corners of the housing assembly 100, thereby avoiding bubbles and wrinkles.

It is noted that, referring to FIG. 2, the bending angle α refers to an angle defined between the bottom portion 11 and a tangent line of the side wall 12. A larger bending angle α results in a larger curvature of the side wall 12. In an implementation, the bending angle α may refer to a maximum angle among angles defined between the bottom portion 11 and tangent lines of the side wall 12. In some implementations of the present disclosure, the bending angle α is 90 degrees, such that the housing assembly 100 has relatively smooth contour lines and provides an improved grip and comfort. The housing assembly 100 and the housing body 10 can define openings (not illustrated in the accompanying drawings) for a camera according to actual requirements, and a position of the opening is not limited herein.

In the implementations of the present disclosure, a shape of the bottom portion 11 is not limited herein. Those skilled in the art can flexibly design the bottom portion 11 according to the actual requirements, for example, the bottom portion 11 can be designed to be a flat surface or a curved surface, such that design requirements of housing assemblies in various shapes can be satisfied, the structural diversity of the housing assembly 100 can be realized, and the market competitiveness of the housing assembly 100 can be improved.

In the implementations of the present disclosure, a material of the housing body 10 is not limited herein, and those skilled in the art can choose the material of the housing body 10 according to the actual requirements. In the implementations of the present disclosure, the housing body 10 is made of glass, and thus the housing assembly 100 has relatively high glossiness and transparency. Moreover, the glass is easily moldable and has a relatively good molding effect, which is beneficial to preparing the housing assemblies in various shapes.

In an implementation, the flexible film layer 20 satisfies at least one of the following conditions. The flexible film layer 20 is made from at least one of thermoplastic polyurethane (TPU), polyethylene (PE), or polyvinyl chloride (PVC). Since each of the above materials has a relatively high elongation at break, the flexible film layer 20 can be perfectly attached to the first surface 13 of the housing body 10, thereby avoiding bubbles and wrinkles, and improving the yield rate of the housing assembly 100.

The flexible film layer 20 has the elongation at break falling within a range from 150% to 300%. For example, the elongation at break of the flexible film layer 20 may be 150%, 160%, 170%, 180%, 190%, 200%, 210%, 220%, 230%, 240%, 250%, 260%, 270%, 290%, or 300%. Therefore, a higher elongation at break results in better tensile properties of the flexible film layer 20, such that the flexible film layer 20 and the housing body 10 can be perfectly attached together, without bubbles or wrinkles. In addition, the flexible film layer 20 can be adaptably attached to the housing assembly 100 having any shape, and thus the housing assembly 100 can be selected from various kinds of housing assemblies. When the elongation at break of the flexible film layer 20 is lower than 150%, the flexible film layer 20 has relatively poor tensile properties, and during attaching the flexible film layer 20 to the housing body 10, the flexible film layer 20 is not easily stretched, resulting in an imperfect attachment between the flexible film layer 20 and the housing body 10, and thus wrinkles or air bubbles are easily formed. When the elongation at break of the flexible film layer 20 is higher than 300%, the flexible film layer 20 has a greater flexibility, such that the flexible film layer 130 is relatively susceptible to deformation during attaching the flexible film layer 20 to the housing body 10, which easily leads to poor stability of the flexible film layer 20 and is not conducive to the aesthetics of the housing assembly 100.

The flexible film layer 20 has a surface energy (also referred to as a surface tension) higher than or equal to 32 dyn/cm. For example, the surface energy of the flexible film layer 20 may be 32 dyn/cm, 34 dyn/cm, 36 dyn/cm, 38 dyn/cm, 40 dyn/cm, 42 dyn/cm, 44 dyn/cm, 46 dyn/cm, 48 dyn/cm, or 50 dyn/cm. Therefore, it is convenient to form a decorative layer 30 on the flexible film layer 20, where the higher the surface energy, the more active the flexible film layer 20, and the decorative layer 30 is more easily formed on a surface of the flexible film layer 20. When the surface energy of the flexible film layer 20 is lower than 32 dyn/cm, the flexible film layer 20 is relatively stable, which is not conducive to a formation of the decorative layer 30.

The flexible film layer 20 has an elastic modulus (also referred to as a modulus of elasticity) falling within a range from 800 MPa to 2000 MPa. For example, the elastic modulus of the flexible film layer 20 may be 800 MPa, 850 MPa, 900 MPa, 950 MPa, 1000 MPa, 1100 MPa, 1200 MPa, 1300 MPa, 1400 MPa, 1500 MPa, 1600 MPa, 1700 MPa, 1800 MPa, 1900 MPa, or 2000 MPa. Since the flexible film layer 20 has relatively good flexibility, the flexible film layer 20 can be perfectly attached to the housing body 10 curved at the edges at an arbitrary angle, without bubbles and wrinkles. When the elastic modulus of the flexible film layer 20 is higher than 2000 MPa, the flexible film layer 20 has relatively poor tensile properties, and during attaching the flexible film layer 20 to the housing body 10, the flexible film layer 20 is not easily stretched, resulting in an imperfect attachment between the flexible film layer 20 and the housing body 10. When the elastic modulus of the flexible film layer 20 is lower than 800 MPa, the flexible film layer 130 is more susceptible to deformation during attaching the flexible film layer 20 to the housing body 10, which easily leads to poor stability of the flexible film layer 20 and is not conducive to the aesthetics of the flexible film layer 20.

The flexible film layer 20 has a thickness falling within a range from 0.025 mm to 0.15 mm. For example, the thickness of the flexible film layer 20 may be 0.025 mm, 0.05 mm, 0.1 mm, or 0.15 mm. Therefore, the thickness of the flexible film layer 20 falls within a suitable range, thereby facilitating not only the attachment between the flexible film layer 20 and the housing body 10, but also the formation of the decorative layer 30 on the flexible film layer 20. In addition, the thickness of the flexible film layer 20 falling within the suitable range does not make the overall thickness of the housing assembly 100 to be relatively large.

Figure 3:
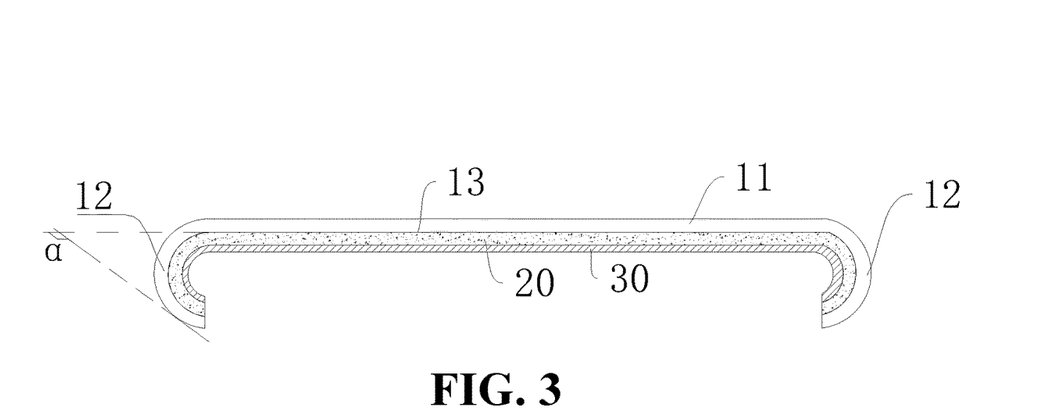
FIG. 3 is a cross-sectional structural view of the housing assembly illustrated in FIG. 1 in another implementation of the present disclosure.
Figure 4:
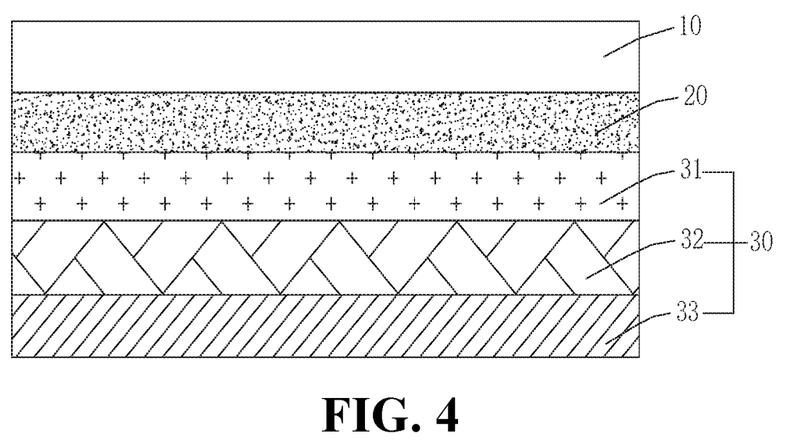
FIG. 4 is a partially schematic cross-sectional structural view of a housing assembly in another implementation of the present disclosure.

Further, in some implementations, some textures or patterns can be directly formed on the flexible film layer 20 to enrich the appearance aesthetics of the housing assembly 100. In other implementations, the housing assembly 100 further includes the decorative layer 30 disposed on a surface of the flexible film layer 20 away from the housing body 10. Referring to FIG. 3 and FIG. 4 (only part of the housing assembly 100 corresponding to the bottom portion 11 illustrated in FIG. 3 is taken as an example in FIG. 4), the decorative layer 30 includes at least one of an ultraviolet transfer layer 31, a coating layer 32, or an ink layer 33. In an implementation, the ultraviolet transfer layer 31 is disposed on the surface of the flexible film layer 20 away from the housing body 10. The coating layer 32 is disposed on a surface of the ultraviolet transfer layer 31 away from the flexible film layer 20. The ink layer 33 is disposed on a surface of the coating layer 32 away from the flexible film layer 20. Therefore, various desired patterns can be formed on the flexible film layer 20, such that the housing assembly 100 has various high-gloss appearance patterns and appearance expressive abilities. In an implementation, the ultraviolet transfer layer 31 can be formed to have a variety of types of patterns. Those skilled in the art can appreciate that in the foregoing implementations, the decorative layer 30 includes all the ultraviolet transfer layer 31, the coating layer 32, and the ink layer 33. When the decorative layer 30 is designed to have merely one or two of the ultraviolet transfer layer 31, the coating layer 32, and the ink layer 33, a layer(s) not included in the decorative layer 30 may be removed. For example, when the decorative layer 30 only includes the ultraviolet transfer layer 31 and the ink layer 33 (that is, the decorative layer 30 does not include the coating layer 32), the ultraviolet transfer layer 31 is disposed on the surface of the flexible film layer 20 away from the housing body 10, and the ink layer 33 is disposed on the surface of the ultraviolet transfer layer 31 away from the flexible film layer 20. Other implementations can be deduced by such analogy, and will not be described in detail herein.

In an implementation, the ultraviolet transfer layer 31 satisfies at least one of the following conditions.

The ultraviolet transfer layer 31 has a Shore hardness higher than or equal to A70. For example, the Shore hardness of the ultraviolet transfer layer 31 may be A70, A80, A90, A100, D20, D30, D40, D50, D60, D70, D80, D90, or D100. During attaching the flexible film layer 20 to the housing body 10, the ultraviolet transfer layer 31 may also be stretched to a certain extent as the flexible film layer 20 is stretched. Due to that the ultraviolet transfer layer 31 has a relatively high Shore hardness, cracks of the ultraviolet transfer layer 31 can be avoided during stretching the ultraviolet transfer layer 31 (generally, during manufacturing the housing assembly 100, the decorative layer 30 is first formed on the flexible film layer 20, and then the flexible film layer 20 is attached to the housing body 10), thereby improving the yield rate of the housing assembly 100. In some implementations, the Shore hardness of the ultraviolet transfer layer is higher than D50, and thus cracks of the ultraviolet transfer layer 31 can be avoided.

An ultraviolet glue has an elongation at break higher than or equal to 50%. For example, the elongation at break of the ultraviolet glue may be 50%, 55%, 60%, 65%, 70%, 75%, or 80%, and thus cracks of the ultraviolet transfer layer 31 can be further avoided during stretching the ultraviolet transfer layer 31. In an implementation, the ultraviolet transfer layer 31 has an elongation at break higher than or equal to 50%. For example, as an implementation, the ultraviolet transfer layer 31 is formed by the ultraviolet glue.

The ultraviolet transfer layer 31 has a thickness falling within a range from 8 μm to 12 μm. For example, the thickness of the ultraviolet transfer layer may be 8 μm, 9 μm, 10 μm, 11 μm, or 12 μm, thereby facilitating a formation of the ultraviolet transfer layer 31 with a good pattern. When the thickness of the ultraviolet transfer layer 31 is smaller than 8 μm, it may be too thin to achieve transfer, that is, it is not conducive to the formation of the ultraviolet transfer layer 31. When the thickness of the ultraviolet transfer layer 31 is larger than 12 μm, internal stresses of the ultraviolet transfer layer 31 are relatively large, such that cracks of the ultraviolet transfer layer 31 easily occur during stretching the ultraviolet transfer layer 31 and attaching the ultraviolet transfer layer 31 to the flexible film layer 20.

Further, the coating layer 32 includes at least one coating sub-layer, and the coating layer 32 satisfies at least one of the following conditions.

The coating layer 32 has a thickness smaller than or equal to 350 nm. For example, the thickness of the coating layer 32 may be 350 nm, 320 nm, 300 nm, 280 nm, 260 nm, 240 nm, 220 nm, 200 nm, 180 nm, 160 nm, 140 nm, 120 nm, 100 nm, or 80 nm. When the thickness of the coating layer 32 falls within the above-mentioned range, the coating layer 32 has a relatively low stress. During stretching the flexible film layer 20 and attaching the flexible film layer 20 to the housing body 10, the coating layer 32 is also stretched to a certain extent accordingly. At this point, a lower stress of the coating layer 32 results in that the coating layer 31 is less prone to cracks during stretching the flexible film layer 20 and attaching the flexible film layer 20 to the housing body 10. Moreover, due to that the coating layer 31 has the above-mentioned thickness, the housing assembly 100 may have a beautiful appearance and high glossiness. In some implementations, the thickness of the coating layer 32 is smaller than 300 nm, and thus cracks of the coating layer 32 can be avoided.

When the coating layer 32 includes multiple coating sub-layers stacked together, a difference in thickness between each two adjacent coating sub-layers is smaller than or equal to 80 nm. Therefore, a smaller difference in thickness between each two adjacent coating sub-layers results in lower stresses between each two adjacent coating sub-layers. The lower the stresses between each two adjacent coating sub-layers, the better the coating layer 32 can be avoided from cracks.

The coating layer 32 is formed of a material including, but is not limited to, at least one of silicon dioxide, silicon nitride, titanium dioxide, niobium oxide, zirconia, zinc, or tin. Thus, the housing assembly 100 has an ability of light reflectance and a metallic luster appearance, thereby enriching the appearance aesthetics of the housing assembly 100. In addition, during stretching the flexible film layer 20 and attaching the flexible film layer 20 to the housing body 10, the coating layer 32 made from the above materials does not crack when being stretched and bent at the side wall 12, thereby ensuring the quality of the housing assembly 100.

Further, the ink layer 33 has an elongation at break higher than 50%. For example, the elongation at break of the ink layer 33 may be 50%, 60%, 70%, 80%, 90%, 100%, 110%, 120%, 130%, 140%, or 150%. The ink layer 33 has a thickness falling within a range from 10 μm to 30 μm. For example, the thickness of the ink layer 33 may be 10 μm, 13 μm, 15 μm, 18 μm, 20 μm, 23 μm, 25 μm, 28 μm, or 30 μm. Therefore, the ink layer 33 having the above-mentioned elongation at break has good tensile properties. During attaching the flexible film layer 20 to the housing body 10, the ink layer 33 can be effectively avoided from cracks. Moreover, when the ink layer 33 has a thickness falling within the range from 10 μm to 30 μm, it can be ensured that the ink layer 33 is opaque and the housing assembly 100 has a good appearance. In some implementations of the present disclosure, the elongation at break of the ink layer 33 falls within a range from 50% to 150%, and thus not only the ink layer 33 does not easily crack, but also poor stability of the ink layer 33 due to excessive elongation at break is avoided.

In an implementation, the ink layer 33 may include multiple ink sub-layers stacked together, such that light leakage can be avoided. In addition, the ink layer 33 may have a color such as white, black, gray, and so forth (which is not limited herein), as long as the light leakage can be avoided and the color of the housing assembly 100 is not effected.

Figure 5:
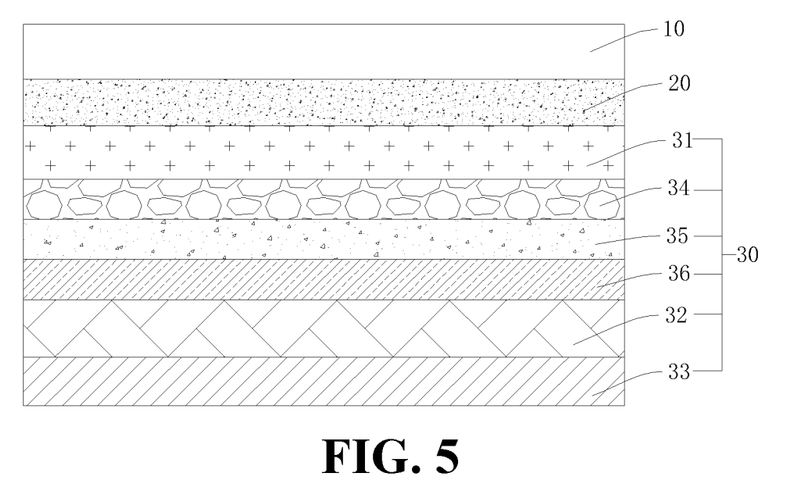
FIG. 5 is a partially schematic cross-sectional structural view of a housing assembly in another implementation of the present disclosure.

Referring to FIG. 5, the decorative layer 30 further includes a first varnish layer 34, an offset printing pattern layer 35, and a second varnish layer 36. In an implementation, the first varnish layer 34 is disposed on the surface of the ultraviolet transfer layer 31 away from the flexible film layer 20. The offset printing pattern layer 35 is disposed on a surface of the first varnish layer 34 away from the flexible film layer 20. The second varnish layer 36 is disposed on a surface of the offset printing pattern layer 35 away from the flexible film layer 20. For example, as an implementation, the first varnish layer 34, the offset printing pattern layer 35, and the second varnish layer 36 are stacked together and sandwiched between the ultraviolet transfer layer 31 and the coating layer 32, and the offset printing pattern layer 35 is sandwiched between the first varnish layer 34 and the second varnish layer 36. Therefore, the appearance aesthetics of the housing assembly 100 can be further enriched without affecting the stretching and bending of the decorative layer 30. In an implementation, the first varnish layer 34 and the second varnish layer 36 are made of transparent resins without pigments, so as to increase attachment forces between different film layers.

In the implementations of the present disclosure, terms "first" and "second" are merely used for descriptive purposes, and should not be understood as indicating or implying relative importance or implicitly indicating the number of technical features indicated. Therefore, the feature defined with the term "first" or "second" may explicitly or implicitly include one or more of the features. In the description of the implementations of the present disclosure, the terms "a plurality of" and "multiple" means that that the number is two or more, unless otherwise clearly specified.

Figure 6:
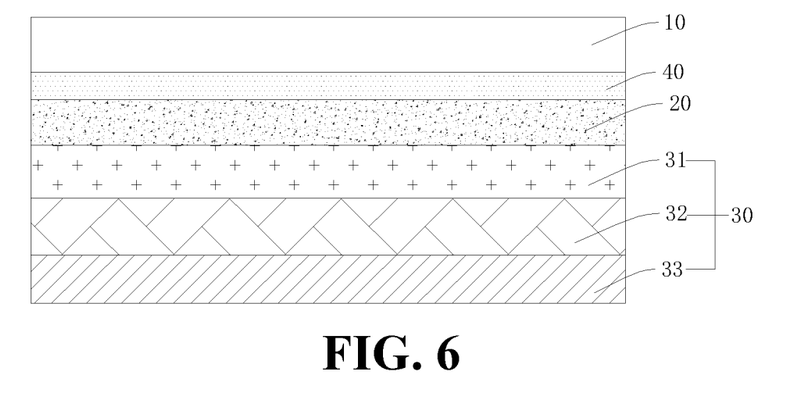
FIG. 6 is a partially schematic cross-sectional structural view of a housing assembly in another implementation of the present disclosure.

Further, referring to FIG. 6, the housing assembly 100 further includes an adhesive layer 40 sandwiched between the housing body 10 and the flexible film layer 20. In an implementation, the adhesive layer 40 has a viscosity higher than or equal to 16 N/in. For example, the viscosity of the adhesive layer 40 may be 16 N/in, 18 N/in, 20 N/in, 22 N/in, 24 N/in, 26 N/in, 28 N/in, 30 N/in, 32 N/in, or 34 N/in. Therefore, by providing the adhesive layer 40 and specifying the viscosity of the adhesive layer 40, the strength of an attachment between the adhesive layer 40 and the housing body 10 can be effectively enhanced.

In an implementation, the adhesive layer 40 is made of an adhesive material including but not limited to a heat-sensitive adhesive, an ultraviolet adhesive, and the like. The above-mentioned adhesive material has a good viscosity that can be maintained for a long time, thereby prolong the service life of the housing assembly 100. It is noted that in the implementations of the present disclosure, the Shore hardness may be measured in accordance with GB-T2411-2008 standard, the elongation at break may be measured in accordance with GB9286-98 standard, and the elastic modulus may be measured in accordance with GB/T22315-2008 standard. The surface tension (or surface energy) may be measured in accordance with dyne test.

Figure 7:
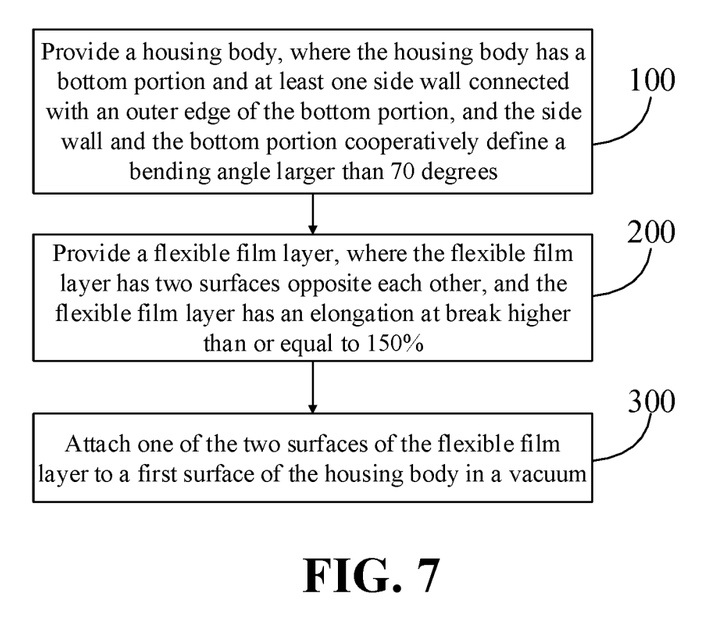
FIG. 7 is a flow chart illustrating a method for manufacturing a housing assembly in an implementation of the present disclosure.

In another aspect of the present disclosure, a method for manufacturing the housing assembly 100 is provided. FIG. 7 is a flow chart illustrating the method for manufacturing the housing assembly 100 in an implementation of the present disclosure. According to the implementations of the present disclosure and referring to FIG. 1, FIG. 2, and FIG. 7, the method for manufacturing the housing assembly 100 is carried out as follows.

At block 100, the housing body 10 is provided. The housing body 10 has the bottom portion 11 and the at least one side wall 12 connected with the outer edge of the bottom portion 11. The side wall 12 and the bottom portion 11 cooperatively define the bending angle larger than 70 degrees.

At block 200, the flexible film layer 20 is provided. The flexible film layer 20 has two surfaces opposite each other. The flexible film layer 20 has the elongation at break higher than or equal to 150%.

At block 300, one of the two surfaces of the flexible film layer 20 is attached to the first surface 13 of the housing body 10 in a vacuum.

Due to the relatively high elongation at break of the flexible film layer 20, the flexible film layer 20 has relatively good tensile properties. Therefore, during manufacturing the housing assembly 100, the flexible film layer 20 can be perfectly attached to the housing body 10 curved at edges at a relatively large angle(s) (i.e., a relatively large bending angle(s)), without air bubbles or wrinkles, thereby effectively enhancing the aesthetic appearance, the appearance expressive ability, and the yield rate of the housing assembly 100 (the yield rate may be as high as 80% or more). Attaching the flexible film layer 20 to the housing body 10 in the vacuum can not only make air be completely excluded, but also make the flexible film layer 20 be tightly attached to the first surface 13 of the housing body 10 to prevent air from entering the housing assembly 100. Furthermore, in this implementation, the method for manufacturing the housing assembly 100 is simple and easy to implement, thereby facilitating industrialized production and automation control.

Figure 8:
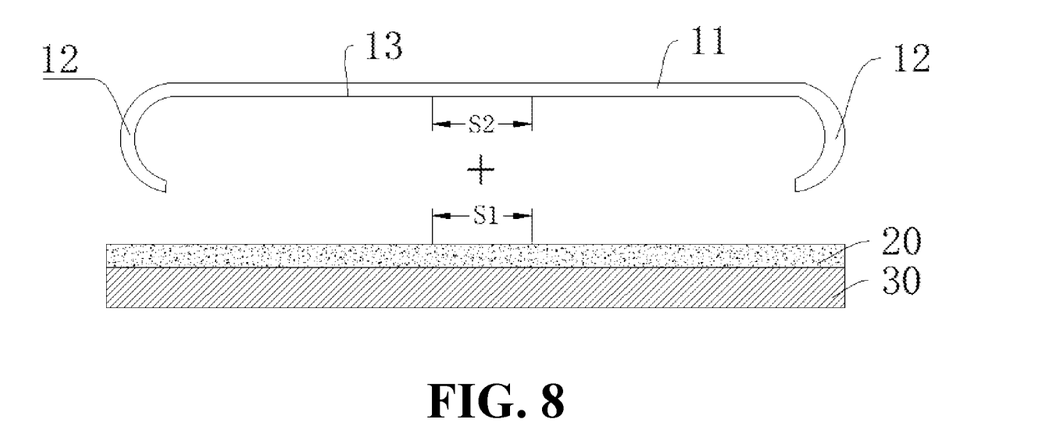
FIG. 8 is a schematic structural view illustrating manufacturing of a housing assembly in an implementation of the present disclosure.
Figure 9:
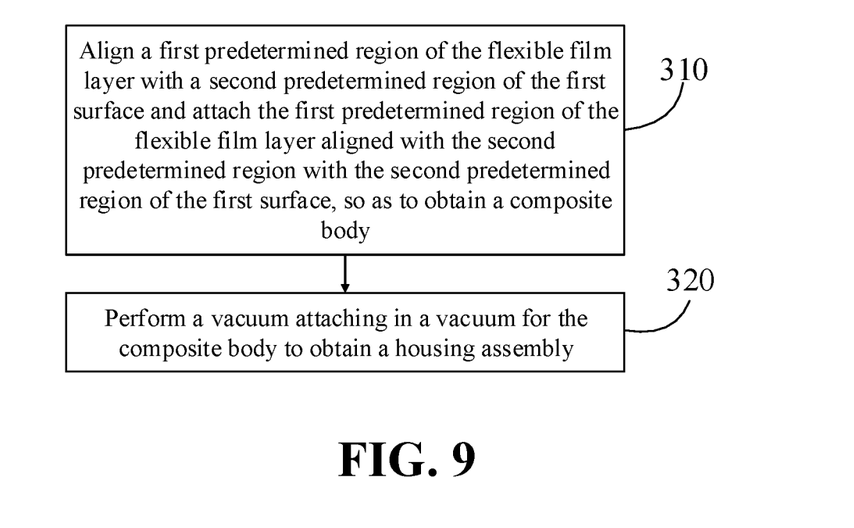
FIG. 9 is a flow chart illustrating operations carried out at block 300 illustrated in FIG. 7 according to an implementation of the present disclosure.

FIG. 8 is a schematic structural view illustrating manufacturing of the housing assembly 100 in an implementation of the present disclosure. FIG. 9 is a flow chart illustrating operations carried out at block 300 illustrated in FIG. 7 according to an implementation of the present disclosure.

At block 310, a first predetermined region S1 of the flexible film layer 20 is aligned with a second predetermined region S2 of the first surface 13 and the first predetermined region S1 of the flexible film layer 20 aligned with the second predetermined region S2 is attached with the second predetermined region S2 of the first surface 13, so as to obtain a composite body.

At S320, a vacuum attaching is performed in the vacuum for the composite body to obtain the housing assembly. Due to aligning the first predetermined region S1 with the second predetermined region S2 and attaching the first predetermined region S1 aligned with the second predetermined region S2, during attaching the one of the two surfaces of the flexible film layer 20 to the first surface 13 of the housing body 10 in the vacuum, a misalignment of the housing body 10 and the flexible body 10 can be avoided, and a good attachment between the flexible film layer 20 and the housing body 10 can be ensured. For example, in an implementation, the flexible film layer 20 and the housing body 10 in the form of the composite body are packed into a bag. Air in the bag is evacuated, such that air between the one of the two surfaces of the flexible film layer 20 and the first surface of the housing body 10 is evacuated and the flexible film layer 20 and the housing body 10 are enabled to be in a vacuum within the bag. Evacuating air between the flexible film layer 20 and the housing body 10 and enabling the flexible film layer 20 and the housing body 10 to be in the vacuum within the bag can not only make air be completely excluded, but also make the flexible film layer 20 be tightly attached to the first surface 13 of the housing body 10 to prevent air from entering the housing assembly 100. Furthermore, in this implementation, the method for manufacturing the housing assembly 100 is simple and easy to implement, thereby facilitating industrialized production and automation control. It is to be noted that the vacuum attaching can be performed in various manners, and is not limited to the above mentioned manners.

For the operations carried out at block 310, the second predetermined region S2 of the first surface 13 of the housing body 10 and the first predetermined region S1 of the flexible film layer 20 can be accurately positioned to be attached together by an automatic positioning system based on charge-coupled devices (CCDs). There is no specific limitation on selection of the first predetermined region S1 and the second predetermined region S2. In order to achieve a good attachment between the flexible film layer 20 and the housing body 10, the second predetermined region S2 may be a central region of the housing body 10 (that is, a central portion of the housing body 10). In this way, a good attachment between the flexible film layer 20 and the housing body 10 can be effectively achieved.

For the operations carried out at block 320, the vacuum attaching (that is, attaching the flexible film layer 20 of the composite body with the housing body 10 of the composite body in the vacuum) is performed in the vacuum for the composite body to obtain the housing assembly 100 as follows. A vacuum packing is performed for the composite body to enable the air between the housing body 10 and the flexible film layer 20 to be excluded, thereby enabling the flexible film layer 20 and the housing body 10 to be in the vacuum and avoiding air bubbles in the housing assembly 100. The vacuum-packed composite body (that is, a vacuum pack of the composite body) is placed into a warm isostatic pressing machine and a warm isostatic pressing processing is performed on the vacuum-packed composite body. In other words, the flexible film layer 20 and the housing body 10 packed are placed into the warm isostatic pressing machine, and the warm isostatic pressing processing is performed for the flexible film layer 20 and the housing body 10 packed. The warm isostatic pressing processing is operated in an environment with a temperature lower than or equal to 150° C. (such as 150° C., 140° C., 130° C., 120° C., 110° C., 100° C., 90° C., 80° C., 70° C., 60° C., 50° C., or 40° C.) and a pressure falling within a range from 50 MPa to 100 MPa (such as 50 MPa, 60 MPa, 70 MPa, 80 MPa, 90 MPa, or 100 MPa). In some implementations, the temperature falls within a range from 70° C. to 80° C. (such as 70° C., 72° C., 74° C., 76° C., 78° C., or 80° C.). In some implementations, the pressure falls within a range from 60 MPa to 70 MPa (such as 60 MPa, 62 MPa, 64 MPa, 66 MPa, 68 MPa, or 70 MPa). Therefore, at the above mentioned temperatures and pressures, the flexible film layer 20 and the housing body 10 of the composite body can be perfectly attached together (that is, the flexible film layer 20 and the housing body 10 are closely and tightly attached together without air bubbles or wrinkles). During attaching the flexible film layer 20 to the housing body 10, no wrinkle forms on the flexible film layer 20 and no air bubble remains between the flexible film layer 20 and the housing body 10, thereby significantly enhancing the appearance expressive abilities of the housing assembly 100. When the temperature is higher than 150° C., the flexible film layer 20 may be subject to a qualitative change due to the high temperature, and thus the performance of the flexible film layer 20 may be affected. When the temperature falls within a range from 70° C. to 80° C., the flexible film layer 20 and the housing body 10 can be perfectly attached together under such milder condition. When the pressure is lower than 50 MPa, the attachment between the flexible film layer 20 and the housing body 10 is poor and attachment forces between the flexible film layer 20 and the housing body 10 are low, such that the flexible film layer 20 may easily fall off during use of the housing assembly 100, and thus air bubbles are easily generated, thereby affecting the appearance of the housing assembly 100. When the pressure is higher than 100 MPa, the flexible film layer 20 may be deformed due to a high pressure, and thus the appearance of the housing assembly 100 may be affected. Furthermore, the above-mentioned method for attaching the flexible film layer 20 to the housing body 10 does not need to be performed in the vacuum chamber, thereby significantly reducing the manufacturing cost. For example, in an implementation, in a non-vacuum environment, the first predetermined region S1 of the flexible film layer 20 is aligned with the second predetermined region S2 of the first surface of the housing body 10, and the first predetermined region S1 of the flexible film layer 20 aligned with the second predetermined region S2 is attached with the second predetermined region S2 of the first surface to obtain the composite body. Then, the composite body is packed into the bag and the air between the housing body 10 and the flexible film layer 20 is excluded, thereby enabling the flexible film layer 20 and the housing body 10 to be in the vacuum within the bag and avoiding air bubbles in the housing assembly 100.

Details of the vacuum packing of the composite body are not limited herein. For example, the composite body can be first placed into the bag, and then the bag can be evacuated to realize the vacuum packing of the composite body (that is, to obtain the vacuum pack of the composite body). According to the above-mentioned method, packing the composite body is not performed in a vacuum environment (for example, a vacuum chamber). For example, in an implementation, after the composite body is packed into the bag, the bag is then evacuated to enable the flexible film layer 20 and the housing body 10 to be in the vacuum within the bag. Thus, the approach for packing the composite body is simple and easy to operate, thereby significantly reducing the cost of manufacturing the housing assembly 100.

Figure 10:
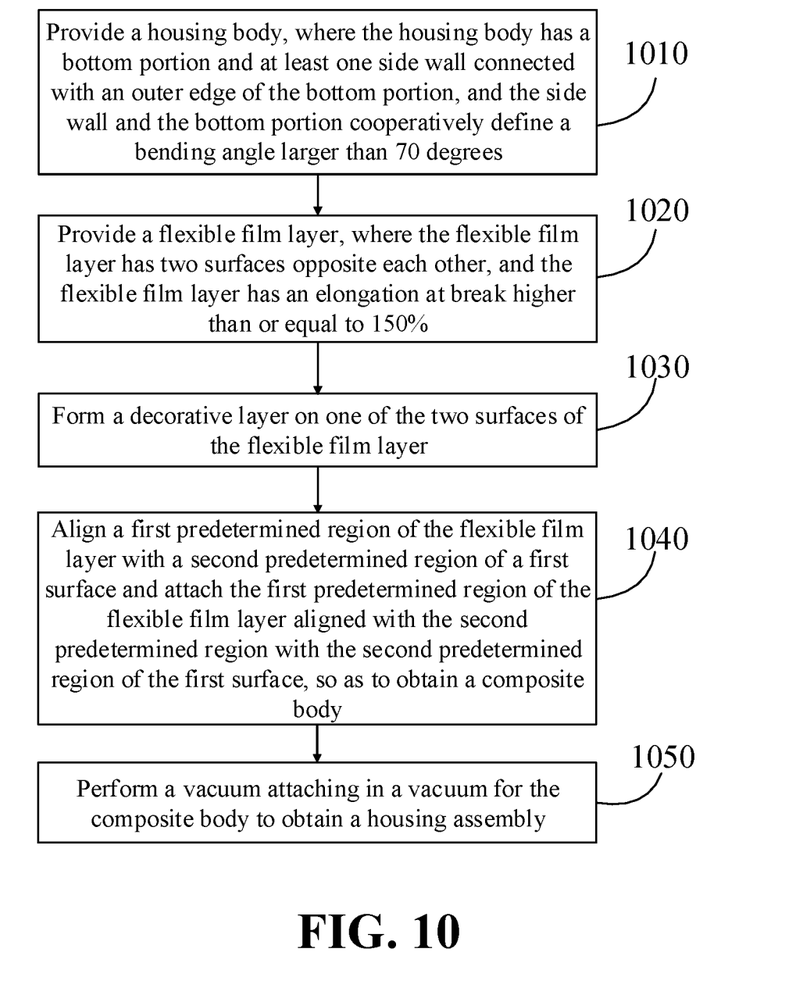
FIG. 10 is a flow chart illustrating a method for manufacturing a housing assembly in an implementation of the present disclosure.

FIG. 10 is a flow chart illustrating a method for manufacturing the housing assembly 100 in an implementation of the present disclosure. Referring to FIG. 10, the method of manufacturing the housing assembly 100 includes operations at block 1010, block 1020, block 1030, block 1040, and block 1050. It is noted that, the operations at block 1010 and block 1020 illustrated in FIG. 10 are the same as the operations at block 100 and block 200 illustrated in FIG. 7 respectively, and the operations at block 1040 and block 1050 are the same as the operations at block 310 and block 320 illustrated in FIG. 9 respectively. Details of the operations at block 1010, block 1020, block 1040, and block 1050 are not repeated herein. In addition to the operations illustrated in FIG. 7 and FIG. 9, the method for manufacturing the housing assembly 100 illustrated in FIG. 10 further includes the operations carried out at block 1030. That is, the method for manufacturing the housing assembly 100 illustrated in FIG. 10 further includes the following prior to attaching, in the vacuum, the one of the two surfaces of the flexible film layer 20 to the first surface 13 of the housing body 10 to obtain the housing assembly 100 (alternatively, prior to aligning the first predetermined region S1 of the flexible film layer 20 with the second predetermined region S2 of the first surface 13 and attaching the first predetermined region S1 aligned with the second predetermined region S2 with the second predetermined region S2). At block 1030, the decorative layer 30 is formed on the other of the two surfaces of the flexible film layer 20 (that is, a surface of the flexible film layer 20 away from the housing body 10). As illustrated in FIG. 3 and FIG. 4, the decorative layer 30 includes at least one of the ultraviolet transfer layer 31, the coating layer 32, or the ink layer 33. In an implementation, the decorative layer 30 is formed as follows. The ultraviolet transfer layer 31 is formed on the surface of the flexible film layer 20 away from the housing body 10. The coating layer 32 is formed on a surface of the ultraviolet transfer layer 31 away from the flexible film layer 20. The ink layer 33 is formed on a surface of the coating layer 32 away from the flexible film layer 20. Therefore, various desired patterns can be formed on the flexible film layer 20, such that the housing assembly 100 has various high-gloss appearance patterns and appearance expressive abilities.

In an implementation, the ultraviolet transfer layer 31 is a pattern layer (i.e., a layer including patterns such as LOGO, for example) formed through an ultraviolet transfer technology. The coating layer 32 can be formed through a process such as chemical vapor deposition, vacuum evaporation, sputtering, etc., such that the housing assembly 100 has a beautiful appearance and high glossiness. The ink layer 33 is obtained by at least one printing process, so as to avoid light leakage and improve the appearance of the housing assembly 100.

In some implementations, referring FIG. 5, operations for forming the decorative layer 30 further include operations for forming the first varnish layer 34, the offset printing pattern layer 35, and the second varnish layer 36. In an implementation, the first varnish layer 34 is formed on the surface of the ultraviolet transfer layer 31 away from the flexible film layer 20. The offset printing pattern layer 35 is formed on the surface of the first varnish layer 34 away from the flexible film layer 20. The second varnish layer 36 is formed on the surface of the offset printing pattern layer 35 away from the flexible film layer 20. Therefore, the appearance aesthetics of the housing assembly 100 can be further enriched without affecting the stretching and bending of the decorative layer 30. In an implementation, the first varnish layer 34 and the second varnish layer 36 are made of transparent resins without pigments, so as to increase attachment forces between different film layers.

Further, the method for manufacturing the housing assembly 100 further includes the following prior to attaching, in the vacuum, the one of the two surfaces of the flexible film layer 20 to the first surface 13 of the housing body 10 to obtain the housing assembly 100 (alternatively, prior to aligning the first predetermined region S1 of the flexible film layer 20 with the second predetermined region S2 of the first surface 13 and attaching the first predetermined region S1 aligned with the second predetermined region S2 with the second predetermined region S2). A glue is coated on a surface of the flexible film layer 20 close to the housing body 10, so as to form the adhesive layer 40 illustrated in FIG. 6. The glue has an initial viscosity lower than or equal to 1 N/in (for example, the initial viscosity may be 1 N/in, 0.5 N/in, or 0 N/in) and a final viscosity higher than or equal to 16 N/in (for example, the final viscosity may be 16 N/in, 18 N/in, 20 N/in, 22 N/in, 24 N/in, 26 N/in, 28 N/in, 30 N/in, 32 N/in, or 34 N/in). Therefore, before attaching, in the vacuum, the one of the two surfaces of the flexible film layer 20 to the first surface 13 of the housing body 10, the glue has a relatively low viscosity and is not fixedly bonded with the flexible film layer 20 and the housing body 10, that is, there is no residual air between the glue and the flexible film layer 20 and between the glue and the housing body 10. In this way, during vacuum packing of the flexible film layer 20 and the housing body 10, air between the flexible film layer 20 and the housing body 10 can be effectively excluded to avoid bubbles in the housing assembly 100. During attaching the flexible film layer 20 to the housing body 10 in the vacuum (or after vacuum packing of the flexible film layer 20 and the housing body 10), special treatments are performed for the glue, so as to increase the viscosity of the glue, thereby effectively attaching the flexible film layer 20 with the housing body 10 and significantly enhancing the strength of the attachment between the flexible film layer 20 and the housing body 10 to avoid cracks of the flexible film layer 20.

The initial viscosity mentioned above refers to the viscosity of the glue before vacuum attaching of the flexible film layer 20 and the housing body 10 and a curing process for the glue. The final viscosity refers to the viscosity of the glue after vacuum attaching of the flexible film layer 20 and the housing body 10 and the curing process for the glue. The change in the viscosity of the glue is realized through certain special treatments. In this way, during attaching the flexible film layer 20 to the housing body 10 in the vacuum, the special treatments are applied to the glue to change the viscosity of the glue, so as to achieve a perfect attachment between the flexible film layer 20 and the housing body 10. The special treatments for the glue can be specified based on a material of the glue. For example, when the glue is a heat-sensitive glue, the glue can be pretreated at high temperature. For another example, when the glue is an ultraviolet glue, the glue can be pretreated via ultraviolet lights. For another example, when the glue is pressure-sensitive glue, the glue can be pretreated by applying a certain pressure. Therefore, the viscosity of the glue can be controlled flexibly and accurately. In an implementation, before placing the flexible film layer 20 and the housing body 10 packed into the warm isostatic pressing machine, the glue used to form the adhesive layer 40 has the initial viscosity, and after the flexible film layer 20 and the housing body 10 packed into the warm isostatic pressing machine, the special treatments (for example, the warm isostatic pressing processing) are applied to the flexible film layer 20 and the housing body 10 packed to cause the glue has the final viscosity.

Furthermore, the flexible film layer 20 is larger than the housing body 10. The method for manufacturing the housing assembly 100 further includes following after attaching, in the vacuum, the one of the two surfaces of the flexible film layer 20 to the first surface 13 of the housing body 10 to obtain the housing assembly 100. The flexible film layer 20 is trimmed to obtain the housing assembly 10. After attaching the flexible film layer 20 to the housing assembly 100 in the vacuum, edges of the flexible film layer 20 may extend beyond edges of the housing body 10, and thus it needs to trim the flexible film layer 20 accordingly. The flexible film layer 20 is trimmed after the flexible film layer 20 is attached to the housing body 10, such that the edges of the flexible film layer 20 extending beyond the edges of the housing body 10 can be accurately controlled in size, and thus the flexible film layer 20 can be perfectly attached to the housing body 10.

When the housing body 10 includes four connected side walls surrounding the bottom portion 11, the flexible film layer 20 is trimmed as follows. First, a first trimming on the flexible film layer 20 is performed along a longitudinal direction and a lateral direction of the housing body 10, then a second trimming on corners of the flexible film layer 20 is performed, then a third trimming on an opening region defined on the flexible film layer 20 is performed (the third trimming can be omitted when no opening region defined on the flexible film layer 20), and finally a trimming operation is performed on the flexible film layer 20 to form a contour of the flexible film layer 20 of the housing assembly 100 (that is, a finishing operation is performed on the flexible film layer 20 to form the contour of the flexible film layer 20 of the housing assembly 100). The first trimming, the second trimming, the third trimming, and the finishing operation are performed to remove parts of the flexible film layer 20 extending out of the housing body 10, so as to obtain the housing assembly 100. Compared with other trimming sequences, the above trimming sequence can improve the yield rate of the housing assembly 100.

Further, trimming the flexible film layer 20 is performed through a laser cutting. In an implementation, the laser cutting has a laser power falling within a range from 700 W to 800 W (for example, the laser power may be 700 W, 720 W, 740 W, 760 W, 780 W, or 800 W). The housing body 10 (for example, when the housing body 10 is made of glass) may be obviously damaged by the ultraviolet light source laser, however, the laser having the above laser power can significantly reduce the damage to glass strength. When the laser cutting has the laser power lower than 700 W, it is relatively unfavorable for trimming the flexible film layer 20. When the laser cutting has the laser power higher than 800 W, the glass strength may be significantly reduced.

According to the implementations of present disclosure, the above method for manufacturing the housing assembly 100 can be performed to manufacture the foregoing housing assembly 100. For the method for manufacturing the housing assembly 100, requirements for the material of the housing body 10, the material of the flexible film layer 20, the surface energy of the flexible film layer 20, the elongation at break of the flexible film layer 20, and components such as the decorative layer 30, and the adhesive layer 40, and the like are consistent with requirements in the foregoing housing assembly 100 for the material of the housing body 10, the material of the flexible film layer 20, the surface energy of the flexible film layer 20, the elongation at break of the flexible film layer 20, and the components such as the decorative layer 30, and the adhesive layer 40, and the like, which are not repeated herein.

In an implementation, the housing assembly 100 manufactured in the above method for manufacturing the housing assembly 100 and the foregoing housing assembly 100 can be used as a rear cover (including a middle frame) of a mobile phone, thereby providing an improved grip and appearance aesthetics, and improving the market competitiveness of the mobile phone.

Figure 11:
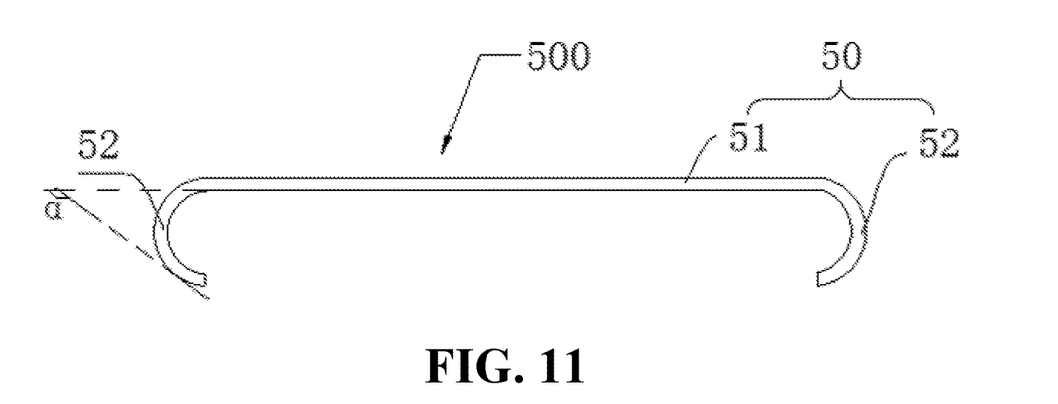
FIG. 11 is a schematic structural view of a glass housing assembly in an implementation of the present disclosure.

In another aspect of the present disclosure, referring to FIG. 11, a housing assembly 500 is provided. The housing assembly 500 is made of glass, and thus, the housing assembly 500 is also referred to as a glass housing assembly 500. The glass housing assembly 500 includes a glass body 50. The glass body 50 has a bottom portion 51 and at least one side wall 52 connected with an outer edge of the bottom portion 51, and each of the at least one side wall 52 and the bottom portion 51 cooperatively define a bending angle α larger than 70 degrees. Thus, the glass housing assembly 500 has a relatively large curved surface (the larger the bending angle, the larger the curvature of the side wall 52) at the edges of the glass housing assembly 500, thereby not only enabling the glass housing assembly 500 to be gorgeous and high-grade, but also facilitating smooth contour lines, and providing smoothness and comfort in the hand when used.

In an implementation, the above-mentioned bending angle α refers to a maximum angle among angles defined between the bottom portion 51 and tangent lines of the side wall 52. A larger bending angle α results in a larger curvature of the side wall 52. The glass housing assembly 500 manufactured with the glass body 50 curved at edges at the relatively large angle(s) has a gorgeous and high-grade appearance, smooth contour lines, and smoothness and comfort in the hand when used. In some implementations of the present disclosure, the bending angle α is 90 degrees, such that the glass housing assembly 500 has relatively smooth contour lines and provides an improved grip and comfort. The glass housing assembly 500 and the glass body 50 can define openings (not illustrated in the accompanying drawings) for a camera according to actual requirements, and a position of the opening is not limited herein.

In addition, the glass body 50 in this implementation may be substantially the same as the housing body 10 of the housing assembly 100 described in the forgoing implementations, and requirements for the glass body 50 in this implementation are consistent with requirements for the housing body 10 of the housing assembly 100 described in the forgoing implementations, which will not be repeated herein. It is appreciated that, for those skilled in the art, the decorative layer 30 can be formed on the surface of the glass body 50 to enrich the appearance aesthetics of the glass housing assembly 500.

Figure 12:
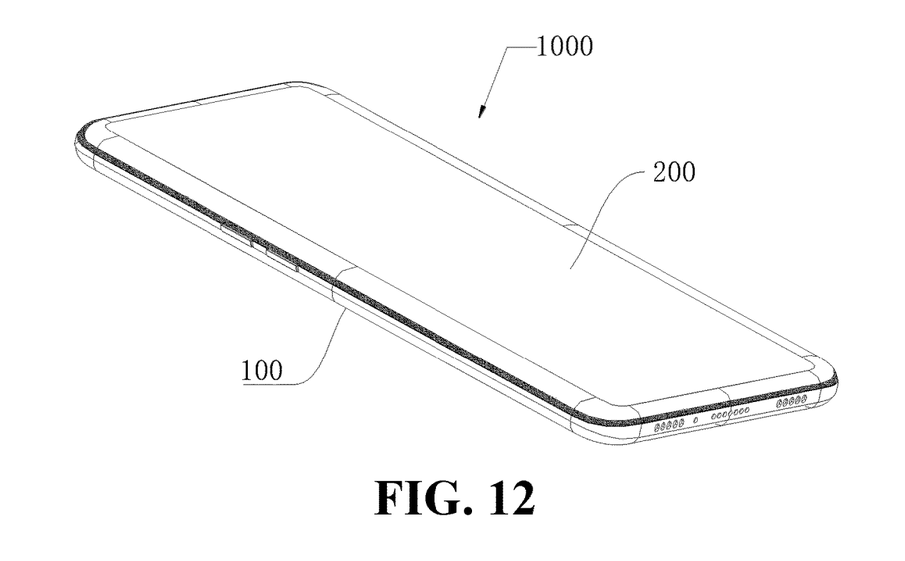
FIG. 12 is a schematic structural view of an electronic device in an implementation of the present disclosure.

In yet another aspect of the present disclosure, an electronic device is provided. According to the implementations of the present disclosure, referring to FIG. 12, the electronic device 1000 includes the foregoing housing assembly 100, a display screen assembly 200 coupled with the housing assembly 100, and a motherboard (not illustrated in FIG. 12). The flexible film layer 20 of the housing assembly 100 is disposed on the first surface of the housing body 10 close to an inside of the electronic device 1000. The display screen assembly 200 and the housing assembly 100 together define an accommodation space. The motherboard is disposed within the accommodation space and electrically coupled with the display screen assembly 200. In another implementation, the housing assembly 100 includes the flexible substrate, and the flexible film layer 20 is disposed on a surface of the flexible substrate close to the inside of the electronic device 1000. Therefore, the housing assembly 100 of the electronic device 1000 has a good appearance and good appearance expressive abilities, thereby further enhancing the overall appearance and the market competitiveness of the electronic device 1000.

Specific types of the electronic device 1000 are not limited herein. For example, the above-mentioned electronic device 1000 includes but is not limited to an electronic device such as a mobile phone, a notebook, an iPad, or a kindle. In some implementations of present disclosure, referring to FIG. 12, the electronic device 1000 is a mobile phone, and housing assembly 100 is used as the rear cover of the mobile phone.

Those skilled in the art can understand that, in addition to the housing assembly 100 described above, the electronic device 1000 also includes structures or components necessary for conventional electronic devices. Taking the mobile phone as an example, in addition to the above-mentioned housing assembly 100, the mobile phone also includes structures or components necessary for conventional mobile phones, such as a glass cover plate, a display panel, an audio processing module, a camera module, and a touch screen.

In the implementations of the present disclosure, it is appreciated that terms "dispose", "interconnect", "connect", and "fix" should be understood in a broad sense unless otherwise specified and limited. For example, terms "interconnect" and "connect" may refer to fixedly connect, detachably connect, or integrally connect. The terms "interconnect" and "connect" may also refer to mechanically connect, electrically connect, or communicate with each other. The terms "interconnect" and "connect" may also refer to directly connect, indirectly connect through an intermediate medium, intercommunicate interiors of two elements, or interact between two elements. For those of ordinary skill in the art, the specific meanings of the above terms in the implementations of the present disclosure can be understood according to specific situations.

In the implementations of the present application, unless otherwise specified and limited, a first feature being disposed "above" or "below" a second feature may indicate that the first feature and the second feature are directly contacted with each other, or the first feature and the second feature are indirectly contacted via an intermediate medium. Moreover, the first feature being disposed "above" the second feature may indicate that the first feature is directly above or obliquely above the second feature, or merely indicate that the first feature is higher in horizontal height than the second feature. The first feature being disposed "below" the second feature may indicate that the first feature is directly below or obliquely below the second feature, or merely indicate that the first feature is lower in the horizontal height than the second feature.

Although the implementations of the present disclosure have been illustrated and described above, it can be understood that the above implementations are examples and cannot be understood as limitations on the present disclosure. Those skilled in the art can make changes, modifications, replacements, and variations for the above implementations within the scope of the present disclosure.

What is claimed is:

1. A housing assembly comprising:
   a housing body having a bottom portion and at least one side wall connected with an outer edge of the bottom portion, wherein each of the at least one side wall and the bottom portion cooperatively define a bending angle larger than 70 degrees;
   a flexible film layer disposed on a first surface of the housing body, wherein the flexible film layer has an elongation at break higher than or equal to 150% and a surface energy higher than or equal to 32 dyn/cm, and the first surface of the housing body comprises a surface of the bottom portion close to the flexible film layer and a surface of the at least one side wall close to the flexible film layer; and
   a decorative layer disposed on a surface of the flexible film layer away from the housing body, wherein the decorative layer comprises an ultraviolet transfer layer disposed on the surface of the flexible film layer away from the housing body and a coating layer disposed on a surface of the ultraviolet transfer layer away from the flexible film layer, wherein the coating layer comprises at least two coating sub-layers, and wherein the coating layer satisfies at least one of the following conditions:
   the coating layer has a thickness smaller than or equal to 350 nm; or
   a difference in thickness between each two adjacent coating sub-layers is smaller than or equal to 80 nm.

2. The housing assembly of claim 1, wherein the flexible film layer satisfies at least one of the following conditions:
   the flexible film layer is made from at least one of thermoplastic polyurethane, polyethylene, or polyvinyl chloride;
   the flexible film layer has the elongation at break falling within a range from 150% to 300%;
   the flexible film layer has an elastic modulus falling within a range from 800 MPa to 2000 MPa; or the flexible film layer has a thickness falling within a range from 0.025 mm to 0.15 mm.

3. The housing assembly of claim 1, further comprising an adhesive layer sandwiched between the housing body and the flexible film layer.

4. The housing assembly of claim 1, wherein the ultraviolet transfer layer satisfies at least one of the following conditions:
the ultraviolet transfer layer has a Shore hardness higher than or equal to A70;
the ultraviolet transfer layer has an elongation at break higher than or equal to 50%; or
the ultraviolet transfer layer has a thickness falling within a range from 8 μm to 12 μm.

5. The housing assembly of claim 1, wherein the bending angle defined between each of the at least one side wall and the bottom portion is 90 degrees.

6. A method for manufacturing a housing assembly, comprising:
providing a housing body, the housing body having a bottom portion and at least one side wall connected with an outer edge of the bottom portion, wherein each of the at least one side wall and the bottom portion cooperatively define a bending angle larger than 70 degrees;
providing a flexible film layer having two surfaces opposite each other, wherein the flexible film layer has an elongation at break higher than or equal to 150% and a surface energy higher than or equal to 32 dyn/cm;
forming a decorative layer on a surface of the two surfaces of the flexible film layer, the surface facing away from the housing body when assembled thereto, wherein forming the decorative layer comprises:
forming an ultraviolet transfer layer on the surface of the flexible film layer facing away from the housing body when assembled thereto;
forming a coating layer on a surface of the ultraviolet transfer layer away from the flexible film layer, wherein the coating layer comprises at least two coating sub-layers, and wherein the coating layer satisfies at least one of the following conditions:
the coating layer has a thickness smaller than or equal to 350 nm; or
a difference in thickness between each two adjacent coating sub-layers is smaller than or equal to 80 nm; and
attaching, in a vacuum, one of the two surfaces of the flexible film layer to a first surface of the housing body, the one the of two surfaces being opposite the surface of the flexible film layer upon which the decorative layer is formed.

7. The method of claim 6, wherein attaching, in the vacuum, the one of the two surfaces of the flexible film layer to the first surface of the housing body comprises:
aligning a first predetermined region of the flexible film layer with a second predetermined region of the first surface and attaching the first predetermined region of the flexible film layer aligned with the second predetermined region with the second predetermined region of the first surface, whereby obtaining a composite body; and
performing, in the vacuum, a vacuum attaching for the composite body to obtain the housing assembly.

8. The method of claim 7, wherein performing, in the vacuum, the vacuum attaching for the composite body to obtain the housing assembly comprises:

performing a vacuum packing for the composite body to enable air between the flexible film layer and the housing body to be excluded; and
placing the composite body packed into a warm isostatic pressing machine and performing a warm isostatic pressing processing for the composite body packed, wherein the warm isostatic pressing processing is operated in an environment with a temperature lower than or equal to 150° C. and a pressure falling with a range from 50 MPa to 100 MPa.

9. The method of claim 6, wherein forming the decorative layer further comprises:
forming an ink layer on a surface of the coating layer away from the flexible film layer.

10. The method of claim 6, further comprising:
prior to attaching, in the vacuum, the one of the two surfaces of the flexible film layer to the first surface of the housing body:
coating a glue on a surface of the flexible film layer close to the housing body, wherein the glue has an initial viscosity lower than or equal to 1 N/in and a final viscosity higher than or equal to 16 N/in.

11. The method of claim 6, further comprising:
the flexible film layer is larger than the first surface of the housing body; and
trimming the flexible film layer, after attaching, in the vacuum, the one of the two surfaces of the flexible film layer to the first surface of the housing body to obtain the housing assembly.

12. The method of claim 11, wherein trimming the flexible film layer comprises:
performing a first trimming on the flexible film layer along a longitudinal direction and a lateral direction of the housing body;
performing a second trimming on corners of the flexible film layer;
performing a third trimming on an opening region defined on the flexible film layer; and
performing a trimming operation on the flexible film layer to form a contour of the flexible film layer of the housing assembly.

13. The method of claim 11, wherein trimming the flexible film layer is performed through a laser cutting, wherein the laser cutting has a laser power falling within a range from 700 W to 800 W.

14. An electronic device comprising:
a housing assembly comprising:
a housing body having a bottom portion and at least one side wall connected with an outer edge of the bottom portion, wherein each of the at least one side wall and the bottom portion cooperatively define a bending angle larger than 70 degrees;
a flexible film layer disposed on a first surface of the housing body close to an inside of the electronic device, wherein the flexible film layer has an elongation at break higher than or equal to 150% and a surface energy higher than or equal to 32 dyn/cm, and the first surface of the housing body comprises a surface of the bottom portion close to the flexible film layer and a surface of the at least one side wall close to the flexible film layer; and
a decorative layer disposed on a surface of the flexible film layer away from the housing body, wherein the decorative layer comprises an ultraviolet transfer layer disposed on the surface of the flexible film layer away from the housing body and a coating layer disposed on a surface of the ultraviolet transfer layer away from the flexible film layer, wherein the coating layer comprises at least two coating sub-layers, and wherein the coating layer satisfies at least one of the following conditions:
the coating layer has a thickness smaller than or equal to 350 nm; or
a difference in thickness between each two adjacent coating sub-layers is smaller than or equal to 80 nm;
a display screen assembly coupled with the housing assembly, wherein the display screen assembly and the housing assembly together define an accommodation space; and
a motherboard disposed within the accommodation space and electrically coupled with the display screen assembly.

15. The electronic device of claim 14, wherein the flexible film layer satisfies at least one of the following conditions:
the flexible film layer is made from at least one of thermoplastic polyurethane, polyethylene, or polyvinyl chloride;
the flexible film layer has the elongation at break falling within a range from 150% to 300%;
the flexible film layer has an elastic modulus falling within a range from 800 MPa to 2000 MPa; or
the flexible film layer has a thickness falling within a range from 0.025 mm to 0.15 mm.

16. The electronic device of claim 14, wherein the decorative layer comprises an ink layer
disposed on a surface of the coating layer away from the flexible film layer.

17. The electronic device of claim 14, wherein the decorative layer further comprises an ink layer disposed on a surface of the coating layer away from the flexible film layer, wherein the ink layer has an elongation at break higher than 50% and a thickness falling within a range from 10 μm to 30 μm.

18. The electronic device of claim 17, wherein
the decorative layer further comprises a first varnish layer, an offset printing pattern layer, and a second varnish layer stacked together;
the first varnish layer, the offset printing pattern layer, and the second varnish layer are sandwiched between the ultraviolet transfer layer and the coating layer;
the offset printing pattern layer is sandwiched between the first varnish layer and the second varnish layer; and
the offset printing pattern layer is disposed on a surface of the second varnish layer away from the ink layer.

* * * * *